United States Patent
Figueiredo et al.

(12)
(10) Patent No.: US 6,215,638 B1
(45) Date of Patent: Apr. 10, 2001

(54) OVERLOAD PROTECTION ASSEMBLY

(75) Inventors: Antonio Albino Figueiredo, Long Valley; David Stevens Kerr, Morris Plains; Mikhail Sumetskiy, Bridgewater, all of NJ (US)

(73) Assignee: Avaya Technology Corp., Miami Lakes, FL (US)

( * ) Notice: Subject to any disclaimer, the term of this patent is extended or adjusted under 35 U.S.C. 154(b) by 0 days.

(21) Appl. No.: 09/425,370

(22) Filed: Oct. 22, 1999

(51) Int. Cl.⁷ ........................................................ H02H 5/04
(52) U.S. Cl. ............................................. 361/119; 361/106
(58) Field of Search ........................... 361/57, 93.7, 93.8, 361/93.9, 103, 106, 111, 119

(56) References Cited

U.S. PATENT DOCUMENTS

| | | | |
|---|---|---|---|
| 4,002,861 | * 1/1977 | Putt | 361/119 |
| 4,215,381 | * 7/1980 | Heisinger | 361/124 |
| 5,991,136 | * 11/1999 | Kaczmarek et al. | 361/119 |

* cited by examiner

*Primary Examiner*—Ronald W. Leja
(74) *Attorney, Agent, or Firm*—Eli Weiss

(57) ABSTRACT

The input resistance of an electrical protective device connected to protect telecommunication transmission lines and associated telecommunication equipment is reduced by connecting a resistor in parallel with the coil of resistance wire of a heat coil. The resistor is a low resistance positive temperature coefficient resistor.

8 Claims, 2 Drawing Sheets

OVERLOAD PROTECTION ASSEMBLY

BACKGROUND OF THE INVENTION

1. Field of the Invention

This invention relates generally to electrical protector devices used in various locations such as telephone central offices to protect the inside equipment from damage as a result of over-voltage and over-current conditions that may occur on the incoming lines and, more particularly, to a protector device which uses a heat coil to provide protection against sneak currents.

2. Description of the Prior Art

In modem telephone engineering, it is usual practice to provide protectors at central offices for each incoming telephone line. These protectors provide protection against excessive voltages resulting, for example, from lightning. In addition, the devices provide protection against over-currents and so-called sneak currents which are not strong enough to do any damage if they flow briefly but which may generate enough heat to char insulation and do other damage if allowed to persist. The sneak currents are produced by voltages of relatively low magnitudes as compared to the excessive voltages first mentioned and usually result from accidental interference between telephone lines and adjacent power lines.

There are many well-known devices which are used at telephone company central offices and increasingly at other locations to provide protection against any over-voltage and over-current conditions that may occur on a telephone line pair. One such device uses a gas tube to provide protection against an over-voltage condition on the telephone line pair to which the device is connected. In operation, the gas-filled tube ionizes at a predetermined voltage level to conduct surging currents to ground potential. These tubes are normally employed in conjunction with heat sensitive elements which become operative on the occurrence of sustained excess current loads, as distinguished from momentary current surges.

One type of heat sensitive device used to protect against over-currents and sneak currents is a wire wound heat coil which is supported upon a bobbin and supports an accompanying coil spring actuator to effect a grounding action. One example of such a device is that shown in U.S. Pat. No. 4,215,381 (hereinafter the '381 patent). The heat coil described in the '381 patent, for sensing excessive or sneak currents, includes a spool having a first conductive flange on one end, a winding of resistance wire about an outer surface, and a pin affixed to an inner surface by a thin coating of solder. A second conductive flange is spaced apart and isolated from the first flange by an insulative member. One end of the resistance wire windings is connected to the spool and an opposite end of the windings is connected to the second flange. Also included is apparatus, surrounding the heat coil and in contact with the second flange, for urging the heat coil subassembly first flange from a first position spaced apart from the ground plate subassembly to a second position in contact with the ground plate subassembly upon passage of excessive currents or sneak currents through the resistance wire windings.

The input impedance of the heat coil used to protect telecommunication lines and equipment connected thereto must satisfy certain specifications. Specifically, the input resistance of the heat coil should have small total resistance. Unfortunately, the heat coils presently in use for sensing excessive currents or sneak currents have a relatively high input resistance.

Another device such as a Positive Temperature Coefficient (PTC) resistor can be used in place of a heat coil for protection against excessive currents and sneak currents. Unfortunately, a PTC does not switch the excessive current or sneak current to ground. A low-impedance PTC will not be able to meet all the safety requirements, whereas the high-impedance needed for safety can degrade the signal with too much loss.

SUMMARY OF THE INVENTION

The present invention solves the aforementioned problem of providing a heat coil with a low input resistance. The low input resistance is obtained by connecting a low resistance positive temperature coefficient (PTC) resistor in parallel with the coil of resistance wire of the heat coil.

DETAILED DESCRIPTION OF THE INVENTION

Figure 1:
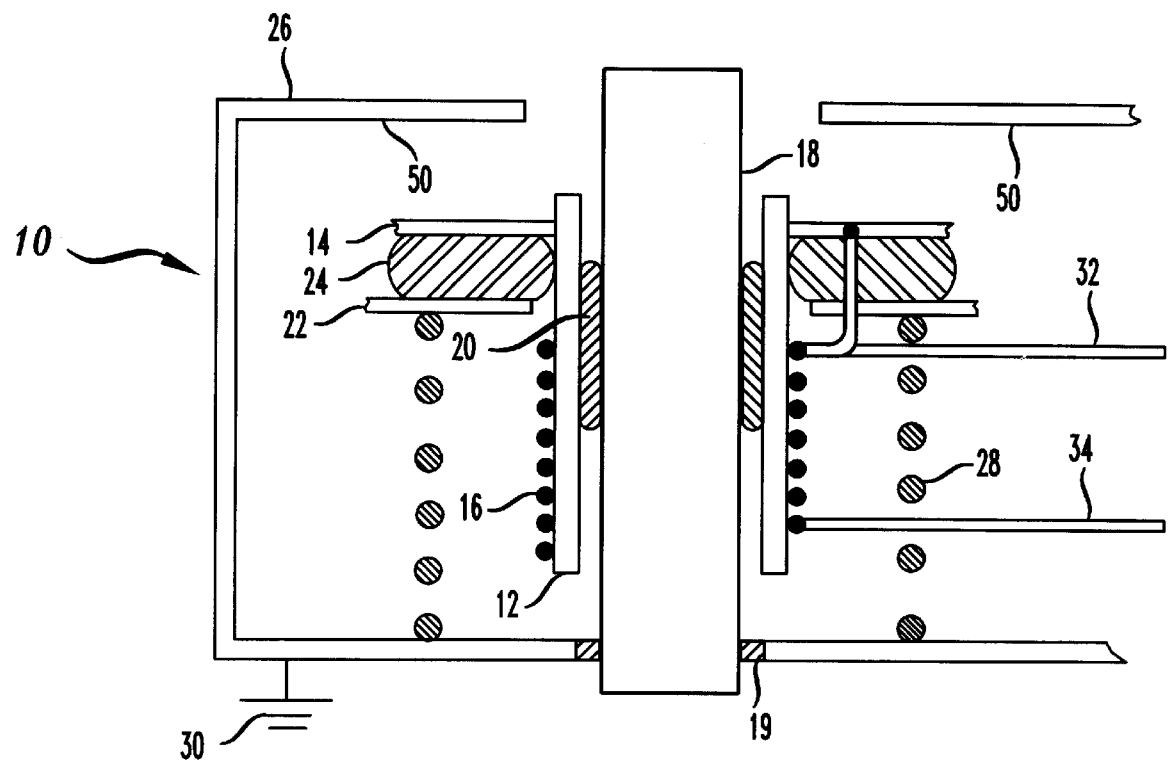
FIG. 1 illustrates a partial cross sectional view of a representative prior art protective device.

Referring to the partial perspective view of the prior art protective device illustrated in FIG. 1 and described in detail in the '381 patent, heat coil assembly 10 is provided for sensing any excessive currents. The assembly includes a metallic spool 12 which has a first conductive flange 14 on one end. Wound around the outer surface of spool 12 is a winding of resistance wire 16. Affixed to an inner surface of spool 12 is a conductive pin 18. Pin 18 is held in place inside spool 12 during normal operating conditions by a thin coating of solder or heat sensitive plastic 20. Intermediate the first conductive flange 14 and resistance wire winding 16 is a second flange 22. Flange 22 is spaced apart and electrically isolated from flange 14 by an insulative member 24. It is also electrically isolated from spool 12. Member 24 is sandwiched in compression between flanges 14 and 22. One end 32 of resistance wire winding 16 is connected to first flange 14. The heat coil assembly 10 is held in position by an electrically conductive holder 26. Holder 26 is securely connected to and supports pin 18 and is electrically isolated from conductive pin 18 by insulator 19. Holder 26 is shaped to provide contact surface 50 positioned to engage flange 14 to establish an electrical path when spool 12 is free to move relative to pin 18.

Surrounding a portion of the heat coil assembly 10 and in contact with second conductive flange 22 is a helical spring 28. Upon passage of excessive currents through resistance wire winding 16, the helical spring 28 urges conductive flange 14 from a first position spaced apart from the electrically conductive holder 26, which is connected to a ground terminal 30 to a second position in contact with surface 50 of the electrically conductive holder 26.

In normal operation, if the current through the resistance wire winding becomes excessive, resistance wire winding 16 heats the spool 12 to cause the thin coating of solder 20 to melt and free spool 12 from being locked to conductive pin 18. Once heat coil assembly is free to move, it is urged by spring 28 to move upward to cause conductive flange 14 to contact surface 50 of electrically conductive holder 26 which is connected to a ground terminal 30. The engagement of conductive flange 14 with conductive holder 26 diverts the flow of current from the live circuit to ground.

Figure 2:
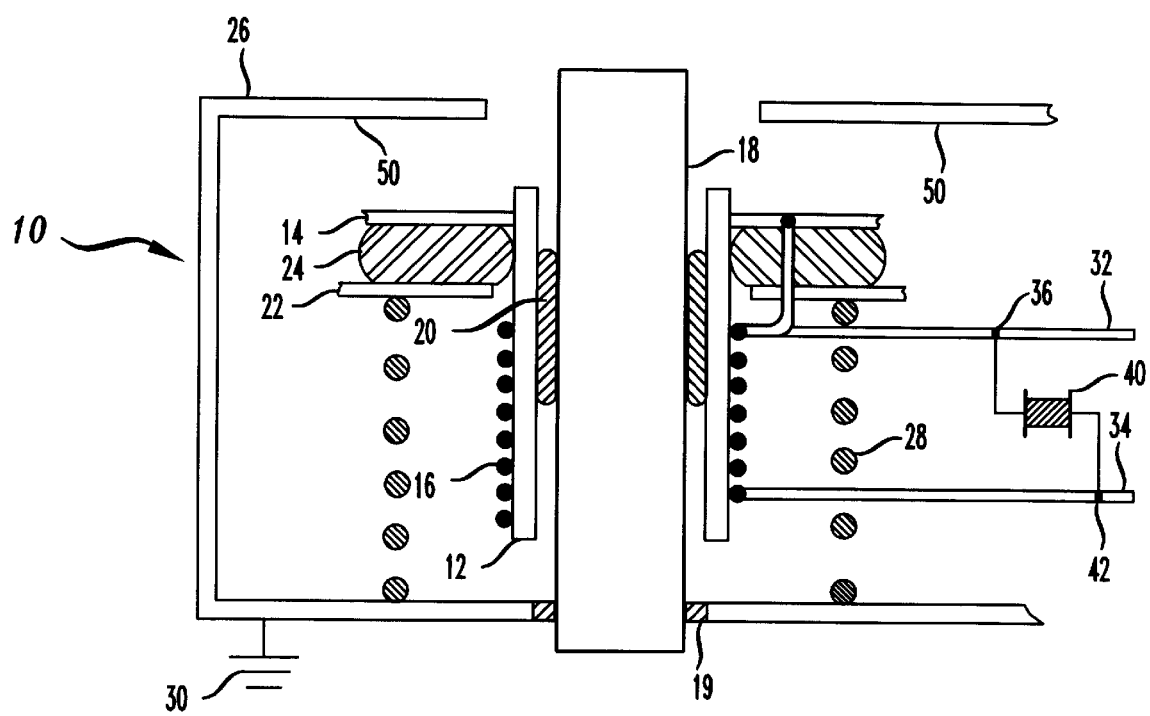
FIG. 2 illustrates a perspective view of a protective device in accordance with the principles of the invention wherein a PTC resistor is connected in parallel with the coil of resistance wire of a heat coil.

FIG. 2 illustrates structure in accordance with the principles of the invention. In the various figures, like parts have similar reference numerals. In the invention, the input resistance of the heat coil is reduced by connecting a low resistance positive temperature coefficient (PTC) resistor 40 in parallel with the coil of resistance wire 16. In operation, the resistance of the PTC resistor 40 increases as the temperature of the resistor increases. If tungston wire is used as a PTC element, its resistance will be increased by at least 10 times as the PTC element is heated by the current that flows therethrough. If, however, Barium Titanate is used as the PTC element, its resistance will be increased by about 1000 times as it is heated by the current that flows therethrough.

Figure 3:
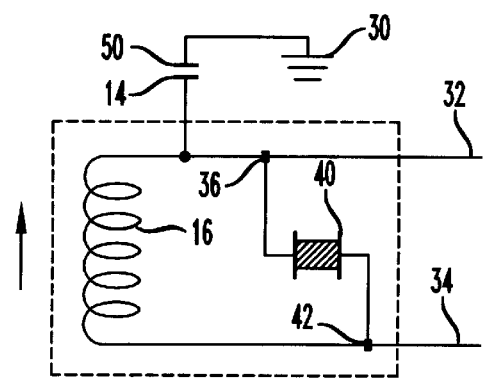
FIG. 3 is a circuit diagram of the embodiment of the invention illustrated in FIG. 2.

FIG. 3 is a schematic diagram of the invention illustrating the parallel connection of the PTC resistor with the coil of resistance wire 16 of the heat coil.

For purposes of illustration, only the operation of the protector assembly will be discussed. Input terminals 32, 34 of the coil of resistance wire 16 are connected in series to a telecommunication transmission line to receive telephone line current. The line current flows from terminal 32 to junction 36 where it divides into two parts. One part flows through coil 16 and the second part flows through PTC resistor 40. The two currents combine at junction 42 and flow out of the heat coil at junction 34. The input resistance of the parallel combination of the low resistance PTC resistor and the coil is less than that of either resistance taken singly. Stated differently, the input resistance of the coil of resistance wire 16 and the PTC resistor connected in parallel is equal to the product of the two resistances divided by the sum of the resistances.

The equation for the input resistances of two parallel resistances is:

$$R = \frac{RX \cdot RY}{RX + RY}$$

where RX is the resistance of the coil of resistance wire and RY is the resistance of the PTC resistor.

Thus, if the resistance of the coil of resistance wire is 10 ohms and that of the resistor is 2 ohms, then the input resistance of the parallel circuit will be $$R = \frac{(10)(2)}{10 + 2};$$

or 1.67 ohms. Clearly, with this invention, the input resistance of the heat coil is reduced because the input resistance of the parallel circuit is less than the resistance of the windings of the heat coil by itself.

During normal operation, the resistance of the low resistance PTC resistor is less than that of the coil of resistance wire and, therefore, the current that flows through the parallel circuit is primarily the current that flows through the PTC resistor. When a low current buildup occurs or when there is an initial excessive current flow through the telecommunication transmission line, as when a power line interferes with a telephone line, the current that flows through the PTC resistor will increase to cause the resistance of the PTC resistor to increase rapidly. The rise in resistance of the PTC resistor will cause the current through the coil of resistance winding to increase which, in turn, will cause the coil to heat up. This buildup of heat in the heat coil will cause the solder 20 which locks the spool 12 to the conductive pin 18 to melt and, thus, free the spool from the pin. Spring 28 will then urge spool 12, resistance wire coil 16 and PTC resistor 40 upward to drive the conductive flange 14 into engagement with conductive holder 26, which is connected to ground and thus divert the current being carried by the transmission line to ground. The heat coil serves to protect the low-impedance PTC, which can be damaged by sustained high currents. If, however, the PTC were to fail, it would fail as an open circuit and all current would flow through the heat coil. Thus, the current would bypass the PTC and would not cause arcing across the PTC.

The invention claimed is:

1. An electrical protector assembly for protecting a circuit against excessive currents, comprising:

a coil of resistance wire for sensing said excessive currents;

a first contact electrically coupled to the coil of resistance wire;

a second contact electrically coupled to a ground terminal and positioned to engage the first contact;

a heat sensitive member coupled to hold the first contact spaced apart from the second contact and thermally coupled to be heated by the coil of resistance wire;

a spring positioned to urge the first contact into engagement with the second contact when the temperature of the heat sensitive member is raised by passage of the excessive current through the coil of resistance wire; and a resistor coupled in parallel with the coil of resistance wire.

2. The electrical protector assembly of claim 1, wherein a resistance of the resistor coupled in parallel with the coil of resistance wire is less than a resistance of the coil of resistance wire.

3. The electrical protector assembly of claim 2, wherein the resistance of the resistor coupled in parallel with the coil of resistance wire increases as current through the resistor increases.

4. The electrical protector assembly of claim 2, wherein current that flows through the coil of resistance wire increases as the resistance of the resistor coupled in parallel with the coil of resistance wire increases.

5. The electrical protector assembly of claim 1, wherein the heat sensitive member comprises solder.

6. The electrical protector assembly of claim 1, wherein the heat sensitive member comprises a plastic that flows when heated.

7. The electrical protector assembly of claim 1, wherein the resistor coupled in parallel with the coil of resistance wire comprises a positive temperature coefficient resistor.

8. The electrical assembly of claim 1, wherein the resistor coupled in parallel with the coil of resistance wire comprises a low resistance positive temperature coefficient resistor.

\* \* \* \* \*